(12) United States Patent
Grech

(10) Patent No.: US 7,966,018 B2
(45) Date of Patent: Jun. 21, 2011

(54) TRANSPORT EFFICIENCY OPTIMIZATION FOR MOBILE IPV6

(75) Inventor: Sandro Grech, Helsinki (FI)

(73) Assignee: Spyder Navigations L.L.C., Wilmington, DE (US)

( * ) Notice: Subject to any disclaimer, the term of this patent is extended or adjusted under 35 U.S.C. 154(b) by 273 days.

(21) Appl. No.: 12/269,454

(22) Filed: Nov. 12, 2008

(65) Prior Publication Data

US 2009/0067381 A1   Mar. 12, 2009

Related U.S. Application Data

(63) Continuation of application No. 10/268,958, filed on Oct. 11, 2002, now Pat. No. 7,466,680.

(51) Int. Cl.
  *H04W 36/00* (2009.01)
  *H04W 4/00* (2009.01)
  *H04W 40/00* (2009.01)
  *H04B 7/216* (2006.01)

(52) U.S. Cl. ........ 455/436; 370/338; 370/328; 370/335; 455/445

(58) Field of Classification Search .......... 455/445, 455/432.1; 370/349, 401, 466, 400, 328
See application file for complete search history.

(56) References Cited

U.S. PATENT DOCUMENTS

| | | | |
|---|---|---|---|
| 6,160,804 A | 12/2000 | Ahmed et al. | |
| 6,256,300 B1 | 7/2001 | Ahmed et al. | |
| 6,477,969 B2 | 11/2002 | Schell-Tomczak et al. | |
| 6,501,746 B1 * | 12/2002 | Leung | 370/338 |
| 6,690,659 B1 | 2/2004 | Ahmed et al. | |
| 6,711,147 B1 * | 3/2004 | Barnes et al. | 370/338 |
| 6,735,202 B1 | 5/2004 | Ahmed et al. | |
| 6,771,962 B2 | 8/2004 | Saifullah et al. | |
| 6,829,483 B2 | 12/2004 | Chen | |
| 6,922,404 B1 * | 7/2005 | Narayanan et al. | 370/338 |
| 6,947,401 B2 | 9/2005 | Malki et al. | |
| 6,956,846 B2 * | 10/2005 | Lewis et al. | 370/352 |
| 6,980,802 B2 * | 12/2005 | Jung | 455/436 |
| 7,079,520 B2 | 7/2006 | Feige et al. | |
| 7,080,151 B1 * | 7/2006 | Borella et al. | 709/230 |
| 7,082,130 B2 * | 7/2006 | Borella et al. | 370/389 |
| 7,120,148 B1 | 10/2006 | Batz et al. | |
| 7,187,931 B2 * | 3/2007 | Trossen | 455/440 |
| 7,193,985 B1 * | 3/2007 | Lewis et al. | 370/338 |
| 7,269,657 B1 | 9/2007 | Alexander et al. | |
| 7,280,546 B1 * | 10/2007 | Sharma et al. | 370/401 |
| 7,295,511 B2 * | 11/2007 | Sharma et al. | 370/217 |

(Continued)

FOREIGN PATENT DOCUMENTS

EP    1 032 178    8/2000

(Continued)

OTHER PUBLICATIONS

European Search Report for EP 09158153.8, dated Jun. 23, 2009.

(Continued)

*Primary Examiner* — Tilahun Gesesse

(57) ABSTRACT

The present invention concerns a method and system for optimizing transport efficiency between a Mobile Node and a Correspondent Node in a Mobile IP network. A short Mobile Node Identifier is assigned to the Mobile Node. A Mobile Node Identifier Destination Option header comprising the assigned Mobile Node Identifier is used instead of the prior art Home Address Destination Option header in subsequent packets between the Mobile Node and the Correspondent Node.

30 Claims, 6 Drawing Sheets

U.S. PATENT DOCUMENTS

| | | |
|---|---|---|
| 7,327,683 B2 | 2/2008 | Ogier et al. |
| 7,346,684 B2 * | 3/2008 | Borella ......................... 709/225 |
| 7,447,183 B1 * | 11/2008 | Leung ........................... 370/338 |
| 7,539,159 B2 * | 5/2009 | Devarapalli et al. .......... 370/328 |
| 7,680,081 B2 * | 3/2010 | Kamura et al. ................ 370/332 |
| 2002/0006133 A1 | 1/2002 | Kakemizu et al. |
| 2002/0086674 A1 * | 7/2002 | Jung ............................. 455/436 |
| 2002/0172207 A1 | 11/2002 | Saito et al. |
| 2004/0004967 A1 | 1/2004 | Nakatsugawa et al. |
| 2006/0248225 A1 | 11/2006 | Batz et al. |

FOREIGN PATENT DOCUMENTS

| | | |
|---|---|---|
| EP | 1 126 682 | 8/2001 |
| EP | 1 182 832 | 2/2002 |
| WO | WO 00/041376 | 7/2000 |
| WO | WO 01/67676 | 9/2001 |

OTHER PUBLICATIONS

International Search Report for PCT/FI2003/00643, mailed Jan. 19, 2004.

International Preliminary Report on Patentability for PCT/FI2003/00643, completed Jan. 10, 2005.

Communication from the European Patent Office for European Application 03 807 859.8-2413, dated May 9, 2006.

* cited by examiner

Home Address Destination Option

```
    0                   1                   2                   3
    0 1 2 3 4 5 6 7 8 9 0 1 2 3 4 5 6 7 8 9 0 1 2 3 4 5 6 7 8 9 0 1
                                   +-+-+-+-+-+-+-+-+-+-+-+-+-+-+-+-+
                                   | Option Type   | Option Length |
   +-+-+-+-+-+-+-+-+-+-+-+-+-+-+-+-+-+-+-+-+-+-+-+-+-+-+-+-+-+-+-+-+
   |                                                               |
   +                                                               +
   |                                                               |
   +                          Home Address                         +
   |                                                               |
   +                                                               +
   |                                                               |
   +-+-+-+-+-+-+-+-+-+-+-+-+-+-+-+-+-+-+-+-+-+-+-+-+-+-+-+-+-+-+-+-+
```

Fig. 1a

Prior Art

Binding Update

```
 +-+-+-+-+-+-+-+-+-+-+-+-+-+-+-+-+-+-+-+-+-+-+-+-+-+-+-+-+-+-+-+-+
 |A| H| S| D| L|    Reserved     |           Sequence #           |
 +-+-+-+-+-+-+-+-+-+-+-+-+-+-+-+-+-+-+-+-+-+-+-+-+-+-+-+-+-+-+-+-+
 |                            Lifetime                           |
 +-+-+-+-+-+-+-+-+-+-+-+-+-+-+-+-+-+-+-+-+-+-+-+-+-+-+-+-+-+-+-+-+
 |                                                               |
 .                         Mobility options                      .
 .                                                               .
 |                                                               |
 +-+-+-+-+-+-+-+-+-+-+-+-+-+-+-+-+-+-+-+-+-+-+-+-+-+-+-+-+-+-+-+-+
```

Fig. 1b  Prior Art

Binding Acknowledgement

```
 +-+-+-+-+-+-+-+-+-+-+-+-+-+-+-+-+-+-+-+-+-+-+-+-+-+-+-+-+-+-+-+-+
 |   Sequence #                  |   Status    |    Reserved     |
 +-+-+-+-+-+-+-+-+-+-+-+-+-+-+-+-+-+-+-+-+-+-+-+-+-+-+-+-+-+-+-+-+
 |                        Lifetime                               |
 +-+-+-+-+-+-+-+-+-+-+-+-+-+-+-+-+-+-+-+-+-+-+-+-+-+-+-+-+-+-+-+-+
 |                                                               .
 .                      Mobility options                         .
 .                                                               |
 +-+-+-+-+-+-+-+-+-+-+-+-+-+-+-+-+-+-+-+-+-+-+-+-+-+-+-+-+-+-+-+-+
```

Fig. 1c  Prior Art

MN ID Destination Option

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  | Length|   MN Identifier   |
+-+-+-+-+-+-+-+-+-+-+-+-+-+-+-+-+-+-+-+-+-+-+-+-+-+-+-+-+-+-+-+-+
```

Fig. 4

TRANSPORT EFFICIENCY OPTIMIZATION FOR MOBILE IPV6

CROSS-REFERENCE TO RELATED PATENT APPLICATIONS

This application is a Continuation of U.S. patent application Ser. No. 10/268,958, filed Oct. 11, 2002, the entire disclosure of which is incorporated herein by reference.

BACKGROUND

Internet Protocol (IP) has been widely used as an OSI (Open Systems Interconnection) network layer protocol in packet switched networks such as Internet for years. The most commonly used version of IP has traditionally been Version 4 (IPv4). A recently developed version, Version 6 (IPv6), is however also beginning to be supported. IPv6 includes the capabilities of IPv4 but provides also additional features. The most obvious improvement in IPv6 over IPv4 is that IP addresses are lengthened from 32 bits to 128 bits, thus providing for significantly larger amount of network addresses. In the following, IP will be used to refer to IPv6 unless otherwise specified.

Mobile IP is an extension to IP aimed to provide mobility support for IP. Using Mobile IP it is possible for a terminal device to move from one link to another without changing its IP address (as seen by the layers above IP) and yet be reachable by other terminal devices. Mobile IP is being developed by IETF (Internet Engineering Task Force) and full specifications may be obtained e.g. from http://www.ietf.org. In the following Mobile IP will be used to refer to Mobile IP support for IPv6 (Mobile IPv6) unless otherwise specified.

In the following terminology related to Mobile IP used in the rest of this document will be described. A node refers to a device that implements IP. A router refers to a node that forwards IP packets not explicitly addressed to itself. A link refers to a communication facility or medium over which nodes can communicate at the OSI link layer. An interface refers to a node's attachment to a link. A subnet prefix refers to a bit string consisting of a number of initial bits of an IP address. A packet refers to an IP packet comprising one or more headers and payload. A header comprises one or more fields. A flag refers to a field of one bit length. Thus a flag may have one of two values, either 1 or 0. One of these values is predetermined to be such that when a flag has that value, the flag is considered to be set, often this value is 1. A unit of data used to deliver information related to the protocols used is referred to as a message. Depending on its length a Mobile IP message may be transmitted in one IP packet or it may be divided in parts and the parts may be transmitted in separate IP packets.

A Home Address refers to an IP address assigned to a Mobile Node and used as the permanent or semi-permanent address of the Mobile Node. A Home Subnet Prefix refers to the IP subnet prefix corresponding to a Mobile Node's Home Address. A Home Link refers to the link on which a Mobile Node's Home Subnet Prefix is defined. Any link other than a Mobile Node's Home Link is referred to as a Foreign Link. Any IP subnet prefix other than a Mobile Node's Home Subnet Prefix is referred to as a Foreign Subnet Prefix. A Mobile Node refers to a node that can change its point of attachment from one link to another, while still being reachable via its Home Address. Movement refers to a change in a Mobile Node's point of attachment to an IP network such that it is no longer connected to the same link as it was previously. If a Mobile Node is not currently attached to its Home Link, the Mobile Node is said to be "away from home".

A Correspondent Node refers to a peer node with which a Mobile Node is communicating. The Correspondent Node may itself be either mobile or stationary. A Care-of Address refers to an IP address associated with a Mobile Node while visiting a Foreign Link. The subnet prefix of this IP address is thus a Foreign Subnet Prefix. A Mobile Node may have multiple Care-Of Addresses at any given time but only one may be registered at the Home Agent. A Home Agent refers to a router on a Mobile Node's Home Link with which the Mobile Node has registered its current Care-Of Address.

Binding refers to the association of the Home Address of a Mobile Node with a Care-of Address for that Mobile Node. A Binding Update message is used by a Mobile Node to notify Home Agent and possibly also other nodes of a new Care-of Address for itself. The format of a Binding Update message is disclosed in FIG. 1b. The Binding Update message comprises an Acknowledge flag (A) set by a sending Mobile Node to request a Binding Acknowledgement message to be returned upon receipt of the Binding Update message. A Home Registration flag (H) is set by a sending Mobile Node to request that the receiving node should act as a Home Agent for this node. The other flags are Single Address Only (S), Duplicate Address Detection (D) and Link-Local Address Compatibility (L). The rest of the fields disclosed in FIG. 1b are Sequence number, Lifetime and Mobility Options. Reserved in FIG. 1b refers to fields that are reserved for future use.

A Binding Acknowledgement message is used to acknowledge receipt of a Binding Update message. The format of a Binding Acknowledgement message is disclosed in FIG. 1c. Reserved in FIG. 1c refers to fields that are yet unused. Status is used to indicate the disposition of the Binding Update. The rest of the fields disclosed in FIG. 1c are Sequence number, Lifetime and Mobility Options.

Mobile IPv6 defines several optional headers that may not be needed in every Mobile IPv6 message. One of these is Home Address Destination Option. Routers may employ a filtering mechanism referred to as ingress filtering e.g. to provide protection against Denial-of-Service-attacks. In order to avoid packets being ingress filtered a Mobile Node uses its Care-Of Address as the IP Source Address when sending packets to Correspondent Nodes. The Home Address Destination Option is used to keep this use of Care-Of Address transparent from higher layers of the Correspondent Nodes. When a Correspondent Node receives a packet which includes the Home Address Destination Option, the Correspondent Node replaces the Care-Of Address in the IP Source Address field of the main IPv6 header with the Home Address contained in the Home Address Destination Option header before forwarding the packet to the higher layers. The format of a Home Address Destination Option header is disclosed in FIG. 1a. Option Type is used to identify the destination option as Home Address Destination Option. Option Length indicates the length of the option excluding the Option Type and Option Length fields. Home Address field comprises the Home Address of the Mobile Node sending the packet.

However, there are some problems related to the use of Home Address Destination Option in Mobile IP. Specifically, as previously described, each packet sent by a Mobile Node must include a 20 byte Home Address Destination Option header comprising a 16 byte or 128 bit IPv6 Home Address of the Mobile Node. For real time communication, e.g. conversational traffic, which typically is characterized by small (typically 30 bytes payload) and frequent (e.g. 50 packets/second) packets, the amount of overhead is considerable.

Packets sent from a Corresponding Node to a Mobile Node carry the Care-Of Address of the Mobile Node in a Destination Address field of the IPv6 header. Additionally Mobile IPv6 uses a 24 byte Routing Header to carry the Home Address of the Mobile Node in every packet. This enables the Mobile Node to replace the Care-Of Address of the Mobile Node in the IPv6 header with the Home Address in the Routing Header before handing the packet over to the layers above IP. These higher layers are therefore only aware of the static Home Address of the Mobile Node. If the Corresponding Node is also a Mobile Node using Mobile IPv6, then each packet between the two nodes needs to have both a Routing Header and a Home Address Destination Option. This translates to a 44 byte overhead to every packet between the two nodes. Assuming that the predominant form of traffic between two Mobile Nodes will be conversational voice traffic (30 bytes payload+60 bytes of RTP/UDP/IPv6 headers), then Mobile IPv6 causes an overhead of approximately 50%.

Thus there is an obvious need for a solution providing optimization of transport efficiency between a Mobile Node and a Correspondent Node in a Mobile IP network.

SUMMARY

The present invention concerns a method and system for optimizing transport efficiency between a Mobile Node and a Correspondent Node in a Mobile IP network. The network comprises at least one Mobile Node and at least one Correspondent Node, and traffic dispatched between the Mobile Node and the Correspondent Node comprises packets. A short Mobile Node Identifier is assigned to the Mobile Node. A Mobile Node Identifier Destination Option header comprising the assigned Mobile Node Identifier is used instead of the prior art Home Address Destination Option header in subsequent packets between the Mobile Node and the Correspondent Node.

In an embodiment of the invention a message, preferably a Binding Update message, is transmitted from the Mobile Node to the Correspondent Node, the message comprising a set T flag, said T flag being a predetermined previously unused field. The T flag triggers the Correspondent Node to execute said assigning the Mobile Node Identifier. Thus the Mobile Node Identifier is assigned in response to the received Binding Update message.

In an embodiment of the invention the Mobile Node Identifier is stored in a Binding Cache of the Correspondent Node in association with a Home Address and a Care-of Address of the Mobile Node.

In an embodiment of the invention an acknowledgement message, preferably a Binding Acknowledgement message, comprising the assigned Mobile Node Identifier is transmitted from the Correspondent Node to the Mobile Node.

In an embodiment of the invention the received Mobile Node Identifier is stored in association with an IP address of the Correspondent Node in a data structure of the Mobile Node.

In an embodiment of the invention said using the Mobile Node Identifier Destination Option header instead of the Home Address Destination Option header is implemented by removing the Home Address Destination Option header from a packet with said Home Address Destination Option header and adding the Mobile Node Identifier Destination Option header to said packet.

In an alternative embodiment of the invention said using the Mobile Node Identifier Destination Option header instead of the Home Address Destination Option header is implemented by adding the Mobile Node Identifier Destination Option header to a packet with no Home Address Destination Option header.

In an embodiment of the invention it is checked in the Correspondent Node whether an IP Source Address and a Mobile Node Identifier within a received packet correspond to the Care-of Address associated with said Mobile Node Identifier in the Binding Cache.

In an embodiment of the invention the Home Address corresponding to the Mobile Node Identifier is retrieved from the Binding Cache in response to a passed check, and the packet is forwarded to layers above IP using the retrieved Home Address as IP Source Address of the packet.

In an embodiment of the invention the Binding Update message further comprises a set Acknowledge flag, the Home Address of the Mobile Node and a Care-of Address of the Mobile Node.

In an embodiment of the invention transport efficiency optimizing may also be applied to traffic between the Mobile Node and its Home Agent.

The invention makes it possible to use a Mobile Node Identifier significantly shorter than 128 bit instead of the 128 bit IPv6 Address used in the Home Address Destination Option field by prior art thus significantly reducing overhead in certain situations in Mobile IP networks, especially when traffic concerned consists of small and frequent packets.

Header compression may be applied in the future over the air interface, even though currently there are no Header Compression algorithms specified for MIPv6 headers. Even when header compression for the MIPv6 headers will be implemented, header compression algorithms will not be scalable beyond the air interface since said algorithms are stateful. A Header Compression algorithm thus operates on a per-link basis and is typically only used over a cellular radio link, due to e.g. the scalability problems imposed by the amount of processing and the amount of states that would be required to extend the compression also to the wired part of the network, e.g. the access network, which might still be bandwidth limited. All MIPv6 traffic from an Access Router onwards would thus have to sustain full MIPv6 overhead. This overhead may be significant particularly for voice traffic.

The end-to-end mechanism of the present invention does not require states in any network node, making the mechanism immune to scalability problems. This mechanism and header compression are complementary since one focuses on header compression over the air and the other focuses on end-to-end MIPv6 header compression.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 1a-1c illustrate prior art message field formats used in Mobile IPv6,

DETAILED DESCRIPTION

Reference will now be made in detail to the embodiments of the present invention, examples of which are illustrated in the accompanying drawings.

Figure 2:
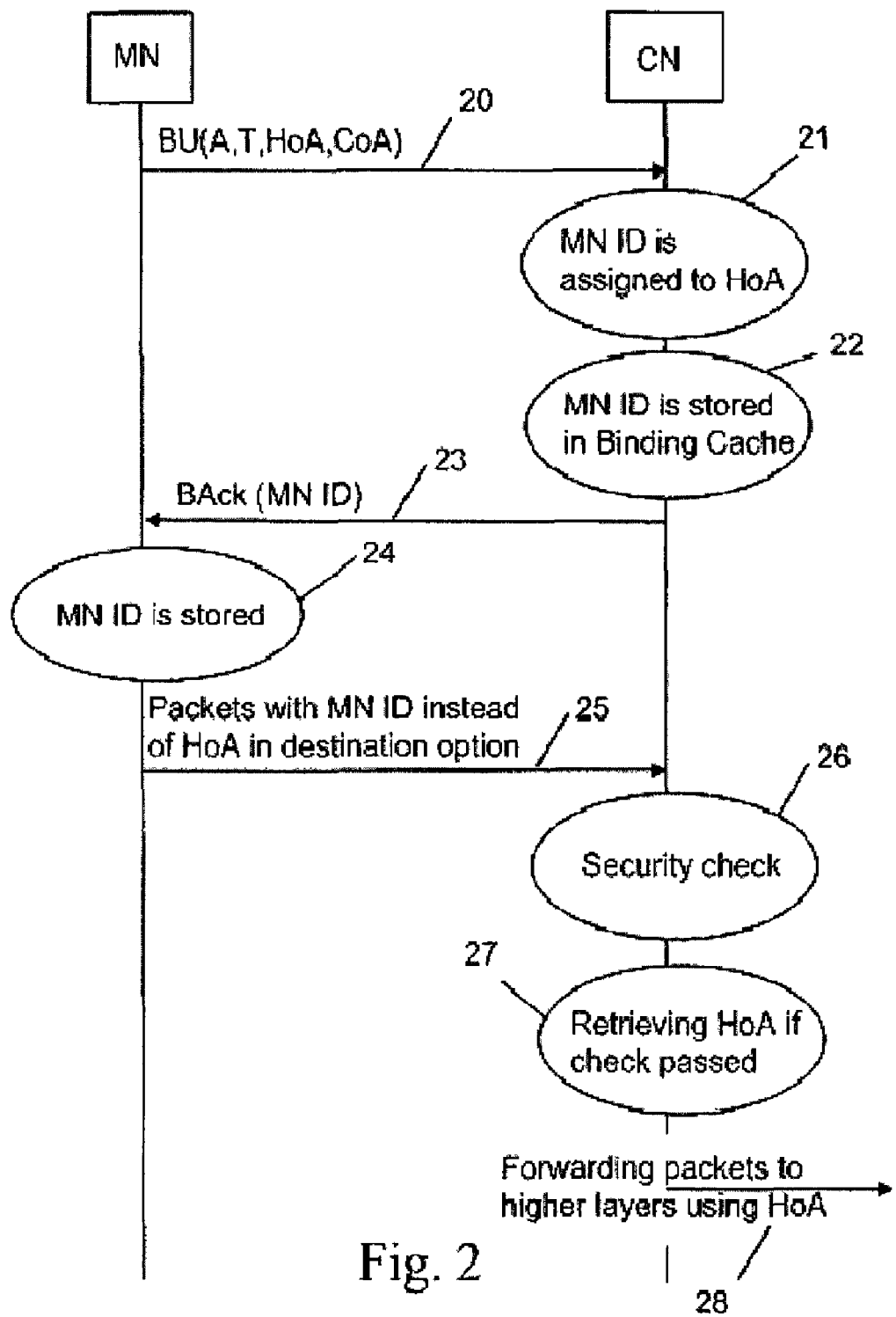
FIG. 2 is a flow chart illustrating a transport efficiency optimization method according to one embodiment of the present invention.

FIG. 2 illustrates a method for optimizing transport efficiency between a Mobile Node MN and a Correspondent Node CN in a Mobile IPv6 network. A Binding Update message BU is transmitted from the Mobile Node MN to the Correspondent Node CN, phase 20. The Binding Update message comprises a set T flag, said T flag being a predetermined previously unused field. The Binding Update message further comprises a set Acknowledge flag A, a Home Address HoA of the Mobile Node and a Care-of Address CoA of the Mobile Node. In response to the set T flag in the received Binding Update message a short Mobile Node Identifier MN ID is assigned to the Home Address of the Mobile Node, phase 21. Short in this context means shorter than the original IPv6 address, i.e. shorter than 128 bits. Preferably, however, the Mobile Node Identifier is as short as possible in order to reduce overhead as much as possible. E.g. a 16 bit Mobile Node Identifier would be sufficient for a Correspondent Node to identify $2^{16}=65536$ different Home Addresses, which would suffice for most Correspondent Node implementations. The Mobile Node Identifier is stored in a Binding Cache of the Correspondent Node in association with the Home Address and the Care-of Address of the Mobile Node, phase 22. A Binding Acknowledgement message BAck comprising the assigned Mobile Node Identifier is transmitted from the Correspondent Node to the Mobile Node, phase 23. The received Mobile Node Identifier is stored in association with an IP address of the Correspondent Node in a data structure of the Mobile Node, phase 24.

A Mobile Node Identifier Destination Option header comprising the assigned Mobile Node Identifier is used instead of the prior art Home Address Destination Option header in subsequent packets sent from the Mobile Node to the Correspondent Node, phase 25. Said using the Mobile Node Identifier Destination Option header instead of the Home Address Destination Option header may be accomplished by removing an existing Home Address Destination Option header from a packet with said Home Address Destination Option header and adding the Mobile Node Identifier Destination Option header to said packet. Said using the Mobile Node Identifier Destination Option header instead of the Home Address Destination Option header may also be accomplished by adding the Mobile Node Identifier Destination Option header to a packet with no Home Address Destination Option header. In the Correspondent Node a security check is performed consisting of checking whether an IP Source Address and a Mobile Node Identifier of a received packet have a matching entry in the Binding Cache of the Correspondent Node, phase 26. In response to a passed check the Home Address corresponding to the Mobile Node Identifier is retrieved from the Binding Cache, phase 27. Finally the packet is forwarded to layers above IP using the retrieved Home Address as IP Source Address of the packet, phase 28. The headers of the packets may be compressed with prior art compression methods, like Robust Header Compression to further decrease the overhead.

Figure 3:
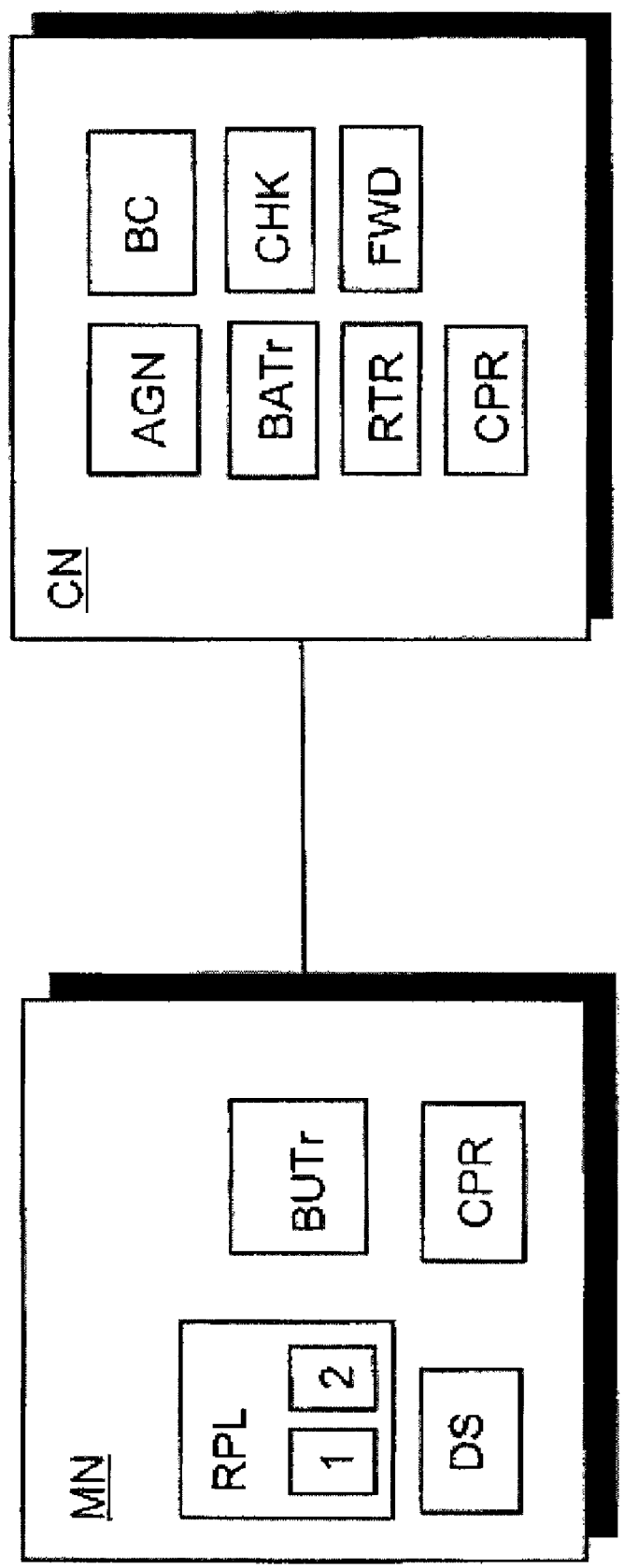
FIG. 3 is a block diagram illustrating a transport efficiency optimization system according to one embodiment of the present invention, and FIG. 4 illustrate a message field format according to one embodiment of the present invention.

FIG. 3 illustrates a system for optimizing transport efficiency between a Mobile Node and a Correspondent Node in a Mobile IP network. In the embodiment of the invention disclosed in FIG. 3 the network comprises at least one Mobile Node MN and at least one Correspondent Node CN, and traffic between the Mobile Node and the Correspondent Node comprises packets.

In the embodiment of the invention disclosed in FIG. 3 the system comprises a BU Transmitter BUTr for transmitting a Binding Update message from the Mobile Node to the Correspondent Node. The Binding Update message comprises a set T flag, said T flag being a predetermined previously unused field. The Binding Update message further comprises a set Acknowledge flag, a Home Address of the Mobile Node and a Care-of Address of the Mobile Node. The system further comprises an assigner AGN for assigning a short Mobile Node Identifier to the Mobile Node in response to the set T flag in a received Binding Update message. The system further comprises a Binding Cache BC of the Correspondent Node for storing the Mobile Node Identifier in association with the Home Address and the Care-of Address of the Mobile Node.

In the embodiment of the invention disclosed in FIG. 3 the system further comprises a BA Transmitter BATr for transmitting a Binding Acknowledgement message comprising the assigned Mobile Node Identifier from the Correspondent Node to the Mobile Node. The system further comprises a data structure DS of the Mobile Node for storing the received Mobile Node Identifier in association with an IP address of the Correspondent Node.

In the embodiment of the invention disclosed in FIG. 3 the system further comprises means RPL for using a Mobile Node Identifier Destination Option header comprising the assigned Mobile Node Identifier instead of a Home Address Destination Option header in subsequent packets sent from the Mobile Node to the Correspondent Node. Further in the embodiment of the invention disclosed in FIG. 3 the means RPL for using a Mobile Node Identifier Destination Option header instead of a Home Address Destination Option header comprise means 1 for removing the Home Address Destination Option header from a packet with said Home Address Destination Option header and for adding the Mobile Node Identifier Destination Option header to said packet. Further in the embodiment of the invention disclosed in FIG. 3 the means RPL for using a Mobile Node Identifier Destination Option header instead of a Home Address Destination Option header comprise means 2 for adding the Mobile Node Identifier Destination Option header to a packet with no Home Address Destination Option header. It should be noted that although in FIG. 3 the means RPL are illustrated to further comprise both the means 1 and the means 2, the means RPL preferably comprise only one of said means 1 and 2. Means 1 may be implemented by modifying e.g. the software implementation of means RPL suitably, whereas means 2 may preferably be implemented by modifying IPv6 protocol and/or related software directly.

The system further comprises a checker CHK for checking in the Correspondent Node whether an IP Source Address and a Mobile Node Identifier within a received packet correspond to the Care-of Address associated with said Mobile Node Identifier in the Binding Cache. The system further comprises a retriever RTR for retrieving the Home Address corresponding to the Mobile Node Identifier from the Binding Cache in response to a passed check, and a forwarder FWD for forwarding the packet to higher layers using the retrieved Home Address as IP Source Address of the packet. The system may further comprise a compressor CPR for compressing the headers of the packets.

In the embodiment of the invention disclosed in FIG. 3 the means RPL, the means 1, the means 2, BU Transmitter BUTr, data structure DS and compressor CPR are preferably implemented in connection with the Mobile Node MN. Correspondingly the assigner AGN, Binding Cache BC, BA Transmitter BATr, checker CHK, retriever RTR, forwarder FWD and another compressor or decompressor CPR are preferably implemented in connection with the Correspondent Node CN. Suitable software/hardware based solutions may be used in implementation.

FIG. 4 illustrates one possible implementation of a Mobile Node Identifier Destination Option header used instead of the prior art Home Address Destination Option header. The Mobile Node Identifier Destination Option header comprises Type and Length fields identical in format to those of the Home Address Destination Option, and an MN Identifier field further comprising the assigned Mobile Node Identifier, thus effectively replacing the Home Address with the assigned Mobile Node Identifier. A new, unique, Type number may be assigned to the Mobile Node Identifier option, in order to distinguish it from other destination options.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method for transporting packets in a mobile Internet Protocol (IP) network, the method comprising:
   assigning a short mobile node identifier to a mobile node in response to a first message received from the mobile node;
   transmitting the short mobile node identifier to the mobile node in a second message; and
   receiving a packet from the mobile node, wherein the packet includes the short mobile node identifier in place of a home address, and further wherein the short mobile node identifier is used throughout an entire communication path between the mobile node and the correspondent node.

2. The method of claim 1, wherein the first message is a binding update message that includes a T flag.

3. The method of claim 2, wherein the short mobile node identifier is assigned in response to the T flag.

4. The method of claim 1, wherein the second message is a binding acknowledgement message.

5. The method of claim 1, further comprising storing the short mobile identifier in association with the home address of the mobile node and a care-of address of the mobile node.

6. The method of claim 1, further comprising identifying the home address of the mobile node based at least in part on the short mobile node identifier in the received packet.

7. The method of claim 6, further comprising forwarding the received packet to a layer of the correspondent node using the identified home address.

8. A method for transporting packets in a mobile Internet Protocol (IP) network, the method comprising:
   transmitting a first message from a mobile node to a correspondent node;
   receiving a second message from the correspondent node in response to the first message, wherein the second message includes a short mobile node identifier assigned to the mobile node; and
   transmitting one or more packets to the correspondent node using the short mobile node identifier in place of a home address, wherein the short mobile node identifier is used throughout an entire communication path between the mobile node and the correspondent node.

9. The method of claim 8, further comprising storing the short mobile node identifier in association with an Internet protocol (IP) address of the correspondent node.

10. The method of claim 8, wherein the first message includes the home address of the mobile node and a care-of address of the mobile node.

11. The method of claim 8, wherein each of the one or more packets includes a mobile node identifier destination option header in place of a home address destination option header.

12. The method of claim 8, wherein the first message include a set acknowledge flag such that a binding acknowledgement message is received from the correspondent node.

13. The method of claim 12, wherein the second message comprises the binding acknowledgement message.

14. A correspondent node comprising:
   a processor configured to assign a short mobile node identifier to a mobile node in response to a first message received from the mobile node;
   a transmitter operatively coupled to the processor and configured to transmit the short mobile node identifier to the mobile node in a second message; and
   a receiver operatively coupled to the processor and configured to receive a packet from the mobile node, wherein the packet includes the short mobile node identifier in place of a home address, and further wherein the short mobile node identifier is used throughout an entire communication path between the mobile node and the correspondent node.

15. The correspondent node of claim 14, wherein the second message includes an Internet protocol (IP) address of the correspondent node.

16. The correspondent node of claim 14, further comprising a binding cache operatively coupled to the processor and configured to store the short mobile node identifier.

17. The correspondent node of claim 14, wherein the short mobile node identifier is stored in association with the home address of the mobile node and with a care-of address of the mobile node.

18. The correspondent node of claim 14, wherein the processor is further configured to identify the home address of the mobile node based at least in part on the short mobile node identifier in the received packet.

19. The correspondent node of claim 18, wherein the processor is further configured to forward the received packet to a layer of the correspondent node using the identified home address.

20. A mobile node comprising:
   a processor;
   a receiver operatively coupled to the processor and configured to receive a second message from a correspondent node in response to a first message from the mobile node, wherein the second message includes a short mobile node identifier assigned to the mobile node; and
   a transmitter operatively coupled to the processor and configured to
      transmit the first message to the correspondent node; and
      transmit a packet to the correspondent node, wherein the packet includes the short mobile node identifier in place of a home address, and further wherein the short mobile node identifier is used throughout an entire communication path between the mobile node and the correspondent node.

21. The mobile node of claim 20, further comprising a data structure operatively coupled to the processor and configured to store the short mobile node identifier.

22. The mobile node of claim 20, wherein the second message is a binding acknowledgement message that includes an Internet protocol (IP) address of the correspondent node.

23. The mobile node of claim 20, wherein the processor is configured to replace a home address destination option header of the packet with a mobile node identifier destination option header.

24. The mobile node of claim 20, wherein the processor is configured to add a mobile node identifier destination option header to the packet.

25. A correspondent node comprising:
- means for assigning a short mobile node identifier to a mobile node in response to a first message received from the mobile node;
- means for transmitting the short mobile node identifier to the mobile node in a second message; and
- means for receiving a packet from the mobile node, wherein the packet includes the short mobile node identifier in place of a home address, and further wherein the short mobile node identifier is used throughout an entire communication path between the mobile node and the correspondent node.

26. The correspondent node of claim 25, wherein the first message is a binding update message that includes a T flag.

27. The correspondent node of claim 26, wherein the short mobile node identifier is assigned in response to the T flag.

28. A mobile node comprising:
- means for receiving a second message from a correspondent node in response to a first message, wherein the second message includes a short mobile node identifier assigned to the mobile node; and
- means for transmitting the first message from the mobile node to the correspondent node and for transmitting one or more packets to the correspondent node using the short mobile node identifier in place of a home address, wherein the short mobile node identifier is used throughout an entire communication path between the mobile node and the correspondent node.

29. The mobile node of claim 28, further comprising means for storing the short mobile node identifier in association with an Internet protocol (IP) address of the correspondent node.

30. The mobile node of claim 28, wherein the first message includes a set acknowledge flag such that the second message is generated by the correspondent node.

* * * * *

UNITED STATES PATENT AND TRADEMARK OFFICE
CERTIFICATE OF CORRECTION

| | | |
|---|---|---|
| PATENT NO. | : 7,966,018 B2 | Page 1 of 1 |
| APPLICATION NO. | : 12/269454 | |
| DATED | : June 21, 2011 | |
| INVENTOR(S) | : Grech | |

It is certified that error appears in the above-identified patent and that said Letters Patent is hereby corrected as shown below:

Title page, under "Notice", in Column 1, Lines 1-3, delete "Subject to any disclaimer, the term of this patent is extended or adjusted under 35 U.S.C. 154(b) by 273 days." and
insert -- Subject to any disclaimer, the term of this patent is extended or adjusted under 35 U.S.C. 154(b) by 273 days.
This patent is subject to a terminal disclaimer. --.

Title page, item (45), under "Date of Patent", in Column 2, Line 1, delete "Jun. 21, 2011" and insert -- *Jun. 21, 2011 --.

Signed and Sealed this
First Day of November, 2011

David J. Kappos
*Director of the United States Patent and Trademark Office*